A. B. BUCHER & H. S. KECK.
HARROW AND PULVERIZER.
APPLICATION FILED JAN. 31, 1914.
1,116,236.
Patented Nov. 3, 1914.
2 SHEETS—SHEET 1.
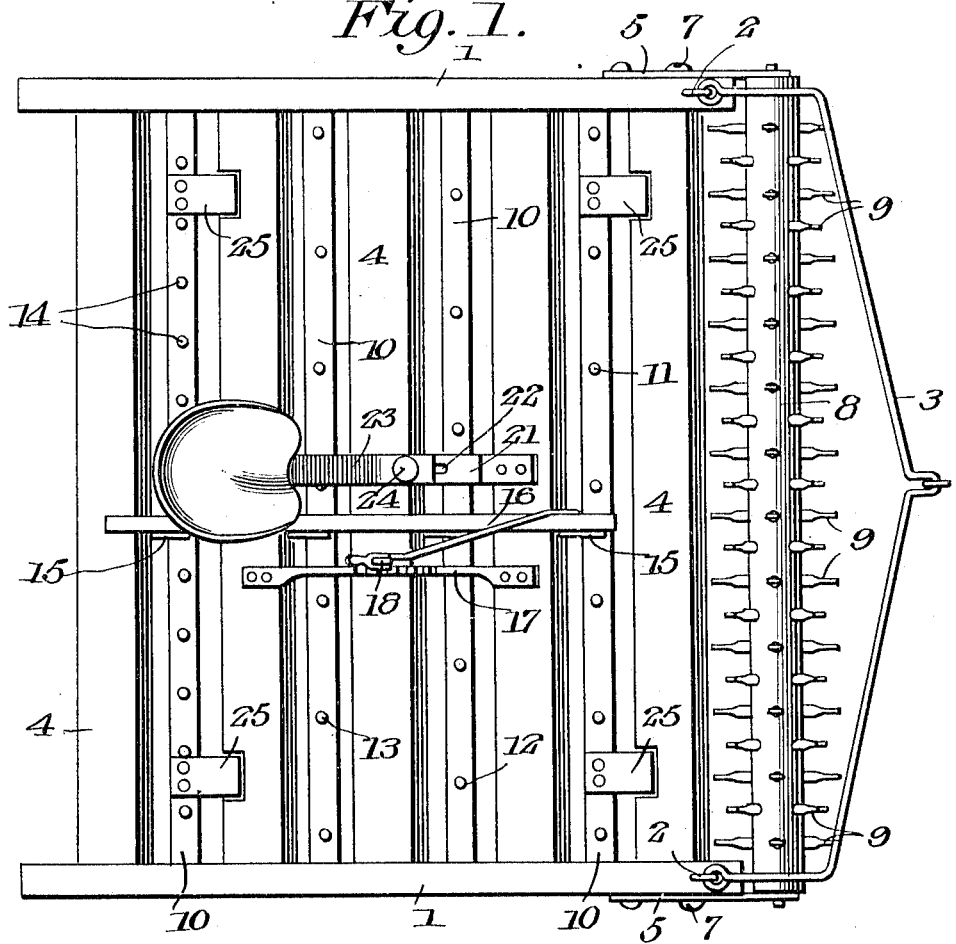
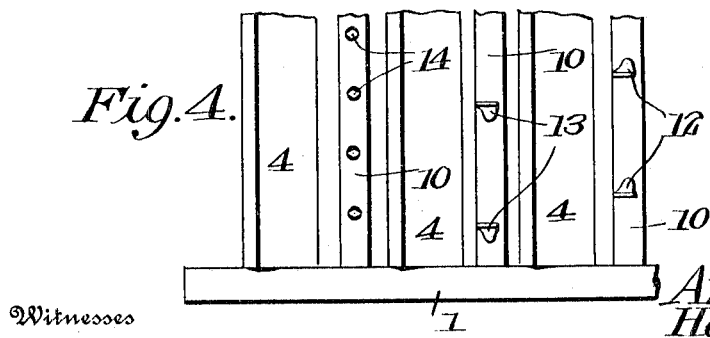
Witnesses
Hugh H. Ott
K. Peacock
Inventors
Amos B. Bucher
Harvey S. Keck
By Victor J. Evans
Attorney A. B. BUCHER & H. S. KECK.
HARROW AND PULVERIZER.
APPLICATION FILED JAN. 31, 1914.

1,116,236.

Patented Nov. 3, 1914.
2 SHEETS—SHEET 2.

Witnesses
Hugh H. Ott
R. Peacock

Inventors
Amos B. Bucher
Harvey S. Keck
By Victor J. Evans
Attorney

UNITED STATES PATENT OFFICE.

AMOS B. BUCHER AND HARVEY S. KECK, OF PAULDING, OHIO.

HARROW AND PULVERIZER.

1,116,236.   Specification of Letters Patent.   Patented Nov. 3, 1914.

Application filed January 31, 1914. Serial No. 815,776.

*To all whom it may concern:*

Be it known that we, AMOS B. BUCHER and HARVEY S. KECK, citizens of the United States, residing at Paulding, in the county of Paulding and State of Ohio, have invented new and useful Improvements in Harrows and Pulverizers, of which the following is a specification.

This invention relates to combined harrows and pulverizers and it consists in the novel features hereinafter described and claimed.

An object of the invention is to provide an implement adapted to be easily and quickly transformed from a harrow to a pulverizer and vice versa and which includes elements adapted to efficiently operate upon the soil to reduce the same to a desired condition.

With the above object in view the implement includes side runners which are connected together by transversely disposed cross bars having inclined under surfaces. A draft bail is pivotally connected with the forward end portions of the runners and arms are pivotally and adjustably secured at the forward end portions of the said runners. A rotating harrow member is journaled between the said bars and carries flattened teeth adapted to encounter the clods and cut the same as the implement is drawn over the soil.

Shafts are journaled between the runners and are also located between the first mentioned cross bars. The said shafts carry harrow teeth of especial design and arrangement and a lever mechanism is provided for simultaneously turning all of the shafts whereby the angle of inclination of the teeth carried by the shafts may be varied with relation to a horizontal.

Figure 2:
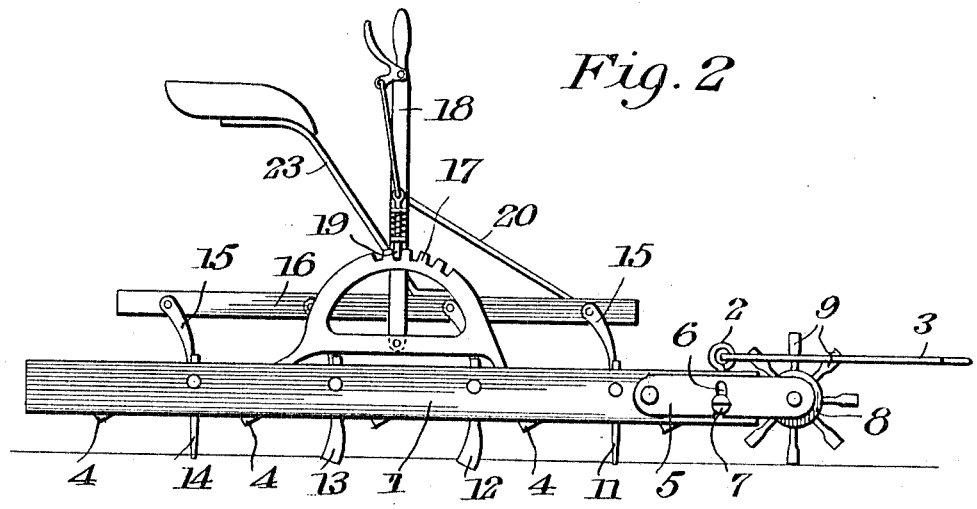
Figure 3:
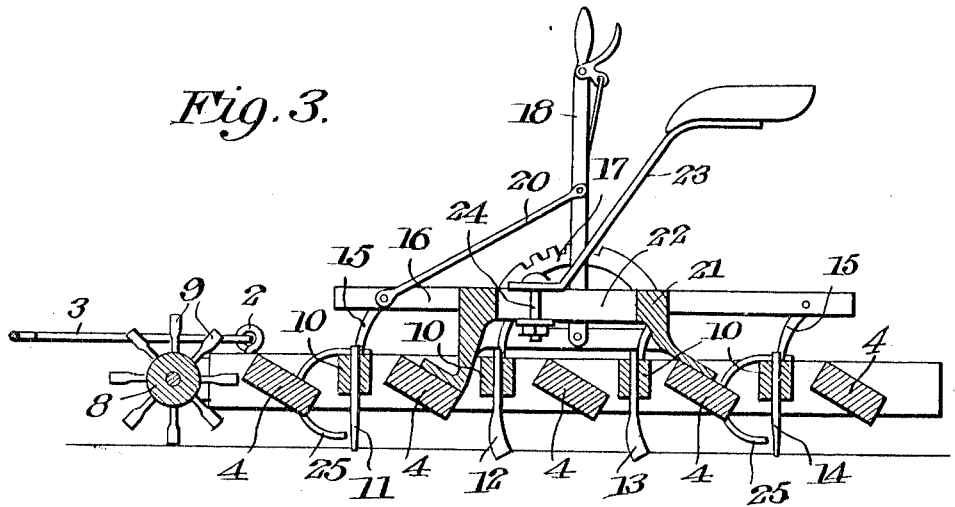

In the accompanying drawing:—Figure 1 is a top plan view of the harrow and pulverizer. Fig. 2 is a side elevation of the same. Fig. 3 is a longitudinal sectional view of the same. Fig. 4 is a detailed under plan view of a portion of the same.

The combined harrow and pulverizer includes runners 1 which are provided at their forward end portions with eyes 2 to which is pivotally connected a draft bail 3. The runners 1 are connected together by transversely disposed cross bars 4 the said bars being so positioned that their under surfaces are inclined with relation to a horizontal. The bars 4 are preferably five in number and the said bars are spaced from one another.

Arms 5 are pivotally connected with the forward end portions of the runners 1 and the said arms are provided with slots 6 which receive set screws 7 carried by the runners 1. A rotating member 8 is journaled between the forward end portion of the arms 5 and the said member is provided with radially disposed teeth 9 which are flattened at their outer ends. By loosening the set screws 7 the arms 5 may be swung vertically so that the rotating member 8 may be adjusted to a desired position with relation to the runners 1 and when at such position they may be secured by tightening the screws 7. Thus means is provided for causing the teeth 9 to operate at a desired distance below the surface of the soil.

Shafts 10 are journaled at their ends in the runners 1 between the cross bars 4 and the said shafts are preferably four in number. The teeth 11 of the first shaft 10 are straight. The teeth 12 of the second shaft 10 are curved longitudinally in one direction. The teeth 13 of the third shaft are curved longitudinally in an opposite direction and the teeth 14 of the fourth shaft are straight but are positioned closer together than the teeth 11 upon the first shaft 10.

Each shaft 10 is provided with an upstanding arm 15 and a bar 16 pivotally connects the upper end of the arm 15 together. A segment 17 is mounted upon two of the intermediate cross bars 4 and a lever 18 is pivotally connected with the said segment. The said lever carries a spring pressed pawl 19 adapted to engage the segment whereby the lever is held at an adjusted position. A rod 20 is pivotally connected at one end with the lever 18 and at its other end is pivotally connected with the bar 16.

A bridge member 21 is mounted upon two of the intermediate cross bars 4 and is provided with a slot 22. A seat post 23 is mounted upon the said bridge member 21 and is provided at its lower end with a bolt 24 which passes through the slot 22 of the said bridge member. It is apparent that by loosening the bolt 24 the seat post 23 may be shifted along the bridge member 21 and when at a desired point may be secured by tightening the said bolt 24. Resilient shoes 25 are provided upon the end portions of the terminal shafts 10 of the set of shafts and the said shoes are adapted to move along the surface of the soil when the said shafts 10 are turned so that their teeth lie against the under inclined surfaces of the cross bars 4.

When the implement is used as a harrow the lever 18 is swung so that the shafts 10 are turned so that the teeth of the respective shafts are caused to extend down approximately at right angles to the lower edges of the runners 1. As the implement is drawn over the soil the teeth 9 of the rotating member 8 encounter the clods and cut the same while the action of the teeth 11, 12, 13 and 14 upon the soil will reduce the same to a desired condition.

When the implement is used as a pulverizer the shafts 10 are turned by manipulating the lever 18 so that the teeth 11, 12, 13 and 14 on the said shafts lie against the inclined undersurfaces of the next adjacent cross bars 4 to the rear. Consequently as the implement is drawn over the soil the inclined undersurface of the cross bars encounter the surface of the soil and pulverize the same. At the same time the teeth 11, 12, 13 and 14 will cut sufficiently into the soil to reduce the small clods at the surface thereof to small particles which may be readily broken or pulverized by the succeeding cross bars 4 passing over the same.

Having described the invention what is claimed is:—

A harrow comprising runners, arms pivotally and adjustably connected to the runners for vertical swinging movement, means for securing the arms at adjusted positions, a rotating harrow member journaled between the arms, cross bars connecting the runners together and fixed with relation to the same and provided with inclined under surfaces, said cross bars being spaced from one another, shafts journaled in the runners in the spaces between the cross bars and having harrow teeth, means for turning the shafts, and resilient shoes mounted on some of the shafts and disposed in advance of some of the teeth and adapted to regulate the depth at which the teeth and the rotating harrow member operate in the soil.

In testimony whereof we affix our signatures in presence of two witnesses.

AMOS B. BUCHER.
HARVEY S. KECK.

Witnesses:
F. P. SPRIGGS,
LELA LEETH.